(12) United States Patent
Müller et al.

(10) Patent No.: US 7,068,213 B2
(45) Date of Patent: Jun. 27, 2006

(54) LEVEL METER

(75) Inventors: Roland Müller, Steinen (DE);
Winfried Maier, Maulburg (DE); Igor Getman, Lörrach (DE); Wolfram Lütke, Inzlingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/275,280

(22) PCT Filed: May 8, 2001

(86) PCT No.: PCT/EP01/05208

§ 371 (c)(1),
(2), (4) Date: Apr. 7, 2003

(87) PCT Pub. No.: WO01/88488

PCT Pub. Date: Nov. 22, 2001

(65) Prior Publication Data

US 2003/0168674 A1    Sep. 11, 2003

(30) Foreign Application Priority Data

May 13, 2000  (DE) .................................. 100 23 497

(51) Int. Cl.
*G01S 13/08* (2006.01)
*G01F 23/00* (2006.01)

(52) U.S. Cl. ..................................... 342/124; 73/290 R (58) Field of Classification Search ................ 342/124; 73/290 R, 290 V; 324/642, 644; 333/21 A, 333/21 R, 125, 135, 137, 248, 252
See application file for complete search history.

(56) References Cited

U.S. PATENT DOCUMENTS

| 5,926,080 A |   | 7/1999  | Palan et al.           |
|-------------|---|---------|------------------------|
| 6,091,373 A | * | 7/2000  | Raguenet ........ 343/778 |
| 6,139,943 A | * | 10/2000 | Long et al. ..... 428/304.4 |
| 6,154,181 A | * | 11/2000 | Hu-Guo et al. ... 343/772 |

FOREIGN PATENT DOCUMENTS

| DE | 9312251.9    | 12/1993 |
|----|--------------|---------|
| DE | 19807593 A1  | 2/1999  |
| EP | 0762089 A2   | 3/1997  |
| EP | 0943902 A1   | 9/1999  |
| EP | 0945714 A1   | 9/1999  |
| WO | WO 98/36490  | 8/1998  |

* cited by examiner

*Primary Examiner*—Thomas H. Tarcza
*Assistant Examiner*—Isam Alsomiri
(74) *Attorney, Agent, or Firm*—Bacon & Thomas (57) ABSTRACT

The invention relates to a microwave-operated level meter with a small blind zone, comprising an antenna for transmitting or for transmitting and receiving microwaves, a microwave generator directly located on said antenna, and a transmitter or transmitter and receiver element pointing into the antenna and directly linked with the microwave generator, said transmitter or said transmitter and receiver element being an extension of the connection.

12 Claims, 8 Drawing Sheets

LEVEL METER

FIELD OF THE INVENTION

The invention relates to a level meter that operates with microwaves.

BACKGROUND OF THE INVENTION

In the measurement of levels, microwaves are transmitted to the surface of a product in a container by means of an antenna, and the echo waves reflected from the surface are received. An echo function that represents the echo amplitudes as a function of the distance is formed, and from that the probable useful echo and its transit time are determined. From the transit time, the distance between the surface of the product and the antenna are determined.

In industrial measurement technology, dielectric rod antennas and horn antennas are commonly used for the transmission and/or reception. Typically, a housing is used that has one housing portion which has the geometry of a short-circuited waveguide.

An exciter element is introduced into the housing portion with the waveguide geometry, and by way of this exciter element microwaves are transmitted and/or received through the housing portion. In transmission, the microwaves are generated by a remote microwave generator. In the antenna, a conversion of delivered line-bound microwaves into microwaves that propagate in free space, and vice versa, is effected via the transmitter or transceiver element.

In the case of a horn antenna, a funnel-shaped portion, forming the horn, that widens in the direction toward the container adjoins the housing. In the case of the rod antenna, a rod of a dielectric is provided that points into the container. Typically, the interior of the housing is filled virtually completely with an insert that comprises a dielectric. In the case of the horn antenna, the insert has a conical end pointing into the container. In rod antennas, the rodlike antenna adjoins the insert.

To determine the level, any known methods that make it possible to measure relatively short distances by means of reflected microwaves can be employed. The best-known examples are pulse radar and frequency modulation continuous wave (FMCW) radar.

In pulse radar, short microwave transmission pulses, hereinafter called wave packets, are periodically transmitted; they are received from the surface of the product and after a distance-dependent transit time are received again. The received signal amplitude as a function of time is the echo function. Each value of this echo function corresponds to the amplitude of an echo reflected at a certain distance from the antenna.

In the FMCW method, a continuous microwave is transmitted, which is periodically linearly frequency-modulated, for instance in accordance with a sawtooth function. The frequency of the echo signal received therefore has a frequency difference, which is dependent on the transit time of the echo signal, compared to the instantaneous frequency of the transmitted signal at the instant of reception. The frequency difference between the transmitted signal and the received signal, which can be obtained by mixing the two signals and evaluating the Fourier spectrum of the mixed signals, thus corresponds to the distance of the reflecting face from the antenna. The amplitudes of the spectral lines of the frequency spectrum obtained by Fourier transform also correspond to the echo amplitudes. This Fourier spectrum in this case therefore represents the echo function.

Figure 1:
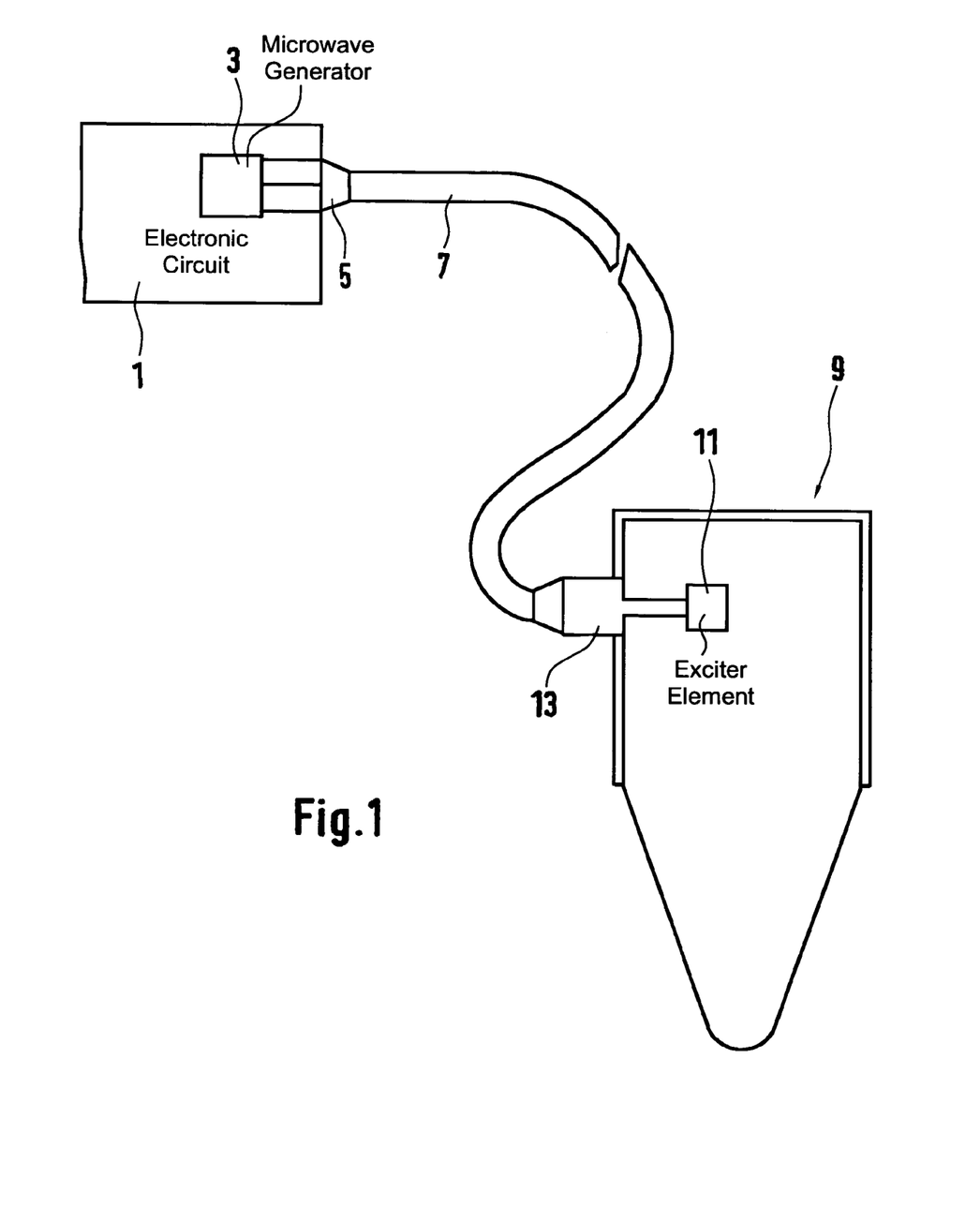
FIG. 1 is a schematic illustration of a conventional level meter.

FIG. 1 schematically shows the layout of a conventional level meter operating with microwaves. It has an electronic circuit 1, which includes a microwave generator 3. The microwave generator 3 is connected via a connection bush 5 to a coaxial cable 7, which in operation carries microwaves from the microwave generator 3 to an antenna 9. An exciter element 11, which is connected to the coaxial cable 7 via a further connection bush 13, is disposed in the antenna 9.

In the above-described level meters that operate with microwaves, there is the problem that not all of the region adjoining the antenna is available as a measurement region. The reason for this is interference signals, which become superimposed on measurement signals in this region.

A substantial proportion of the interference signals is created by both reflections occurring on the way from the microwave generator to the antenna and in the antenna and by multiple reflections along the way.

By means of a suitable antenna geometry, reflections occurring in the region of the antenna can be kept slight. At the input point, that is, the transition from the coaxial cable to the antenna, for microwaves delivered via a lead line, however, there is always a pronounced discontinuity in impedance, which causes reflections and multiple reflections. In these multiple reflections, microwaves generated by the microwave generator are reflected back into the level meter at the input point and reflected once again within the level meter in the direction of the input point. Via the input point, these microwaves then either reach the antenna or are reflected again either entirely or at least in part. These reflections or multiple reflections lead in particular to an artificial lengthening of short microwave pulses that are to be sent.

It is true that within certain limits, input points can be designed so that as little reflection or multiple reflection as possible occurs. However, this design is as a rule effective only for a frequency range with a slight, bandwidth. In microwave signals with a relatively wide frequency bandwidth, of the kind used in level measurement, limits are quickly encountered, so that the proportion of single and multiple reflections is considerable. These interference signals are superimposed on the actual measurement signal. Measuring a level by the pulse radar method can be done only whenever the transit time of the measurement signal is greater than the duration of the transmitted pulse and the time period within which these last-mentioned interference signals have faded. For the FMCW method, it is analogously true that the frequency shift in the measurement signal must be greater than the frequency shift of the interference signals.

The distance in front of the input point or of the antenna, where a measurement is not possible, which is associated with the region in which the interference signals have not yet faded, is typically called the blind zone.

U.S. Pat. No. 5,610,611 describes a level meter in which electromagnetic signals are generated in an electronic circuit and are transmitted on a waveguide. The waveguide carries the electromagnetic signals into a container filled with a product whose level is to be measured, and carries signals, reflected from a surface of the product, back out again.

To avoid reflections and/or multiple reflections caused by the infeed and resulting in an enlarged blind zone, this reference describes connecting the electronic circuit directly to the waveguide. This is possible because the level meter uses exclusively line-bound electromagnetic signals, including within the container itself.

In a level meter in which microwaves are transmitted into free space by means of an antenna, conversely, a separate connection is always provided between the microwave generator and the transmitter or transceiver element. Typically, this connection is a coaxial cable. One end of the connection is connected to the microwave generator by means of a connecting member, such as a plug connector, and another end, again by means of a connecting member, must be connected to the transmitter or transceiver element, which leads to the problems described above.

SUMMARY OF THE INVENTION

It is an object of the invention to disclose a level meter operating with microwaves, with an antenna for transmitting or for transmitting and receiving microwaves, that has only a slight blind zone.

To this end, the invention comprises a level meter operating with microwaves, having
- an antenna for transmitting or for transmitting and receiving microwaves,
- a microwave generator, disposed directly at the antenna, and
- a transmitter or transceiver element, pointing into the antenna and by means of a connection communicating directly with the microwave generator,
- in which the transmitter or transceiver element is an extension of the connection.

In a refinement, the level meter has a printed circuit board, on which the microwave generator is located, and which has one portion, pointing into the antenna, on which portion the transmitter or transceiver element is disposed.

In a refinement, at least one microstrip line serves as the transmitter or transceiver element.

In one embodiment, the antenna includes a cylindrical waveguide, short-circuited on one end by means of a back wall, and the portion of the printed circuit board is introduced laterally into the waveguide and is spaced apart from the back wall.

In a further embodiment of the aforementioned embodiment, the transmitter or transceiver element includes a rectilinear microstrip line, which extends on a face of the portion of the printed circuit board pointing in the transmission direction and ends in the interior of the waveguide.

In a refinement of this last embodiment, an electrically conductive body pointing in the transmission direction is applied to the microstrip line on its end in the interior of the waveguide.

In another embodiment of this last embodiment, the transmitter or transceiver element includes a rectilinear microstrip line, which extends on a face of the portion of the printed circuit board pointing perpendicular to the transmission direction and ends in the interior of the waveguide.

In another embodiment of the embodiment mentioned first, the transmitter or transceiver element includes two rectilinear microstrip lines, which extend perpendicular to one another on faces of the printed circuit board that point in the transmission direction, and which end in the interior of the waveguide.

In another embodiment, the antenna has a cylindrical waveguide short-circuited on the end, and the portion of the printed circuit board is extended into the antenna, parallel to a longitudinal axis of the printed circuit board.

In a refinement of the second embodiment, the transmitter or transceiver element includes a first microstrip line, extending on a first surface of the portion, and a second microstrip line, extending on a second surface of the portion.

In an embodiment of this last refinement, the first and second microstrip lines each have one rectilinear segment, whose first end is connected to the microwave generator and whose second end is adjoined by a curved segment.

In another embodiment, the connection is a microstrip line, and the transmitter or transceiver element is a metal pin, applied to the microstrip line and extending into the antenna.

In a refinement of the invention, the antenna has a thermal decoupler.

One advantage of the invention is that in the level meter of the invention, in operation, microwaves from the microwave generator are carried directly to the transmitter or transceiver element. The transmitter or transceiver element is not a separate component, but instead is a continuation of the connection. As a result, discontinuities in impedance that could lead to reflections or even multiple reflections are reduced markedly. Moreover, the microwave generator is located in the immediate vicinity of the transmitter or transceiver element. The transit time of a microwave signal reflected once or even multiple times is minimal, because the spacing is only slight. Accordingly, such interference signals fade quite rapidly. In level meters according to the invention, the blind zone, if it exists at all since the amplitude of the interference signals is so slight, ends in the interior of the antenna and hence causes no restriction in the measurement region.

BRIEF DESCRIPTION OF THE DRAWINGS

The invention and further advantages will now be described in further detail in conjunction with the drawing figures, in which five exemplary embodiments are shown; in the drawings, identical elements are identified by the same reference numerals.

DESCRIPTION OF THE PREFERRED EMBODIMENTS

Figure 2:
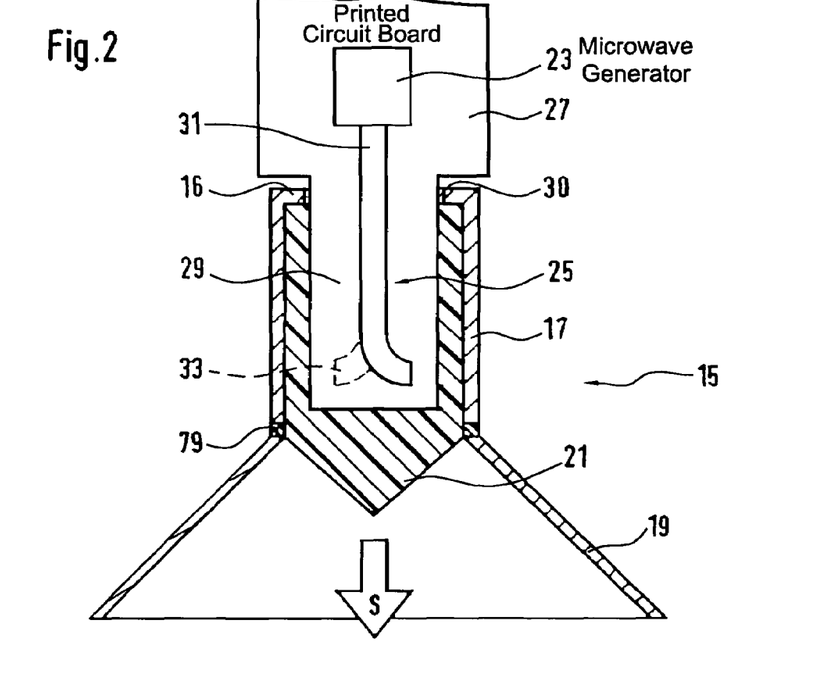
FIG. 2 is a schematic illustration of a level meter of the invention, in which the transmitter or transceiver element has two microstrip lines pointing in the transmission direction.

In FIG. 2, a schematic illustration of a first exemplary embodiment of a level meter of the invention is shown.

It includes an antenna 15 for transmitting, or transmitting and receiving, microwaves. In the exemplary embodiment shown, the antenna 15 is a horn antenna, and it has a cylindrical waveguide 17 short-circuited on one end by a back wall 16, and a funnel-shaped horn 19 adjoining it in the transmission direction. The transmission direction is symbolized in FIG. 2 by an arrow S. A diameter of the horn 19 increases in the transmission direction. The waveguide 17 and the horn 19 comprise an electrically conductive material, such as a special steel. In the interior of the waveguide 17, there is an insert 21, which comprises a dielectric, such as polytetrafluoroethylene (PTFE), and which is substantially cylindrical and fills up the waveguide 17. The insert 21 has a conical tip protruding into the horn 19.

The insert 21 serves primarily to protect against chemical and/or mechanical effects. In a measurement environment in which such protection is not required, the level meter can also be used without the insert 21.

A microwave generator 23 for generating microwaves is disposed directly on the antenna 15. The microwave generator 23 is for instance a pulse radar device, an FMCW device, or a continuous-oscillation microwave oscillator, in each case constructed using planar circuitry. According to the invention, the microwave generator 23 is connected directly with a transmitter or transceiver element 25 that points into the antenna 15.

In the exemplary embodiment shown, the level meter has a printed circuit board 27, on which the microwave generator 23 is located. Still other electronic circuit elements, not shown in FIG. 2, that are suitable for picking up, converting and processing microwave signals, such as filters, directional couplers, mixers, and the like, can be disposed on the printed circuit board 27. These components can likewise be made using planar circuitry. If the antenna 15 is used for both transmission and reception, then a directional coupler should for instance be provided, by way of which microwaves from the microwave generator 23 reach the transmitter or transceiver element 25, and microwaves received by the transmitter or transceiver element 25 reach a unit that further processes the echo signals.

Figure 3:
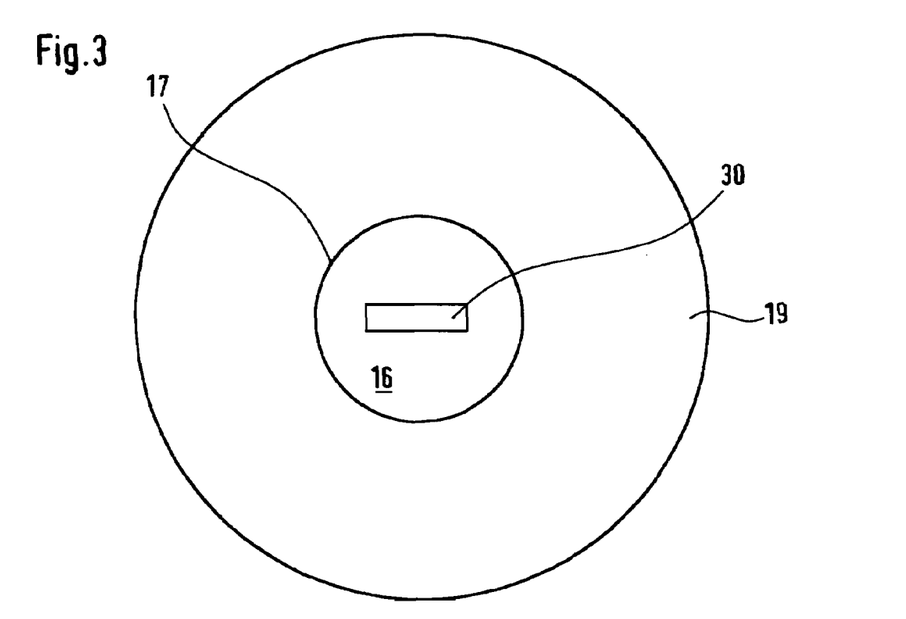
FIG. 3 shows a plan view on the antenna of FIG. 1.

The printed circuit board 27 has a portion 29, which is guided through a gap 30, extending diagonally in the back wall 16 of the waveguide 17, into the antenna 15 parallel to a longitudinal axis of the waveguide 17. FIG. 3 shows a plan view on the antenna 15, in which the gap 31 and its shape can be seen.

The transmitter or transceiver element 25 is located on the portion 29, on the same printed circuit board 27 as the microwave generator 23. The microwave generator 23 and the transmitter or transceiver element 25 are directly connected to one another by means of a connection. Thus the spacing between the transmitter or transceiver element 25 and the microwave generator 23 is minimal.

According to the invention, the transmitter or transceiver element 25 is an extension of the connection between the microwave generator 23 and the transmitter or transceiver element 25. In the exemplary embodiment shown in FIG. 2, at least one microstrip line acts as the connection and as the transmitter or transceiver element 25. As its name already says, a microstrip line is suitable for carrying microwaves. The microwave generator 23 is thus connected directly, and in particular without the interposition of a lead line, to the microstrip line and thus to the transmitter or transceiver element 25 formed by the microstrip line.

In the exemplary embodiment shown in FIG. 2, the transmitter or transceiver element 25 includes a first microstrip line 31, extending on a first surface of the portion 29, and a second microstrip line 33, extending on a second surface of the portion 29. FIG. 2 shows a sectional plane in which the first microstrip line 31 is located. The second microstrip line 33 is located in a different section plane and is therefore represented only by a dashed line.

The two microstrip lines 31, 33 are identical in shape and have one rectilinear segment. A first end of the rectilinear segment is connected to the microwave generator 23, and a curved segment adjoins a second end of the rectilinear segment.

Figure 4:
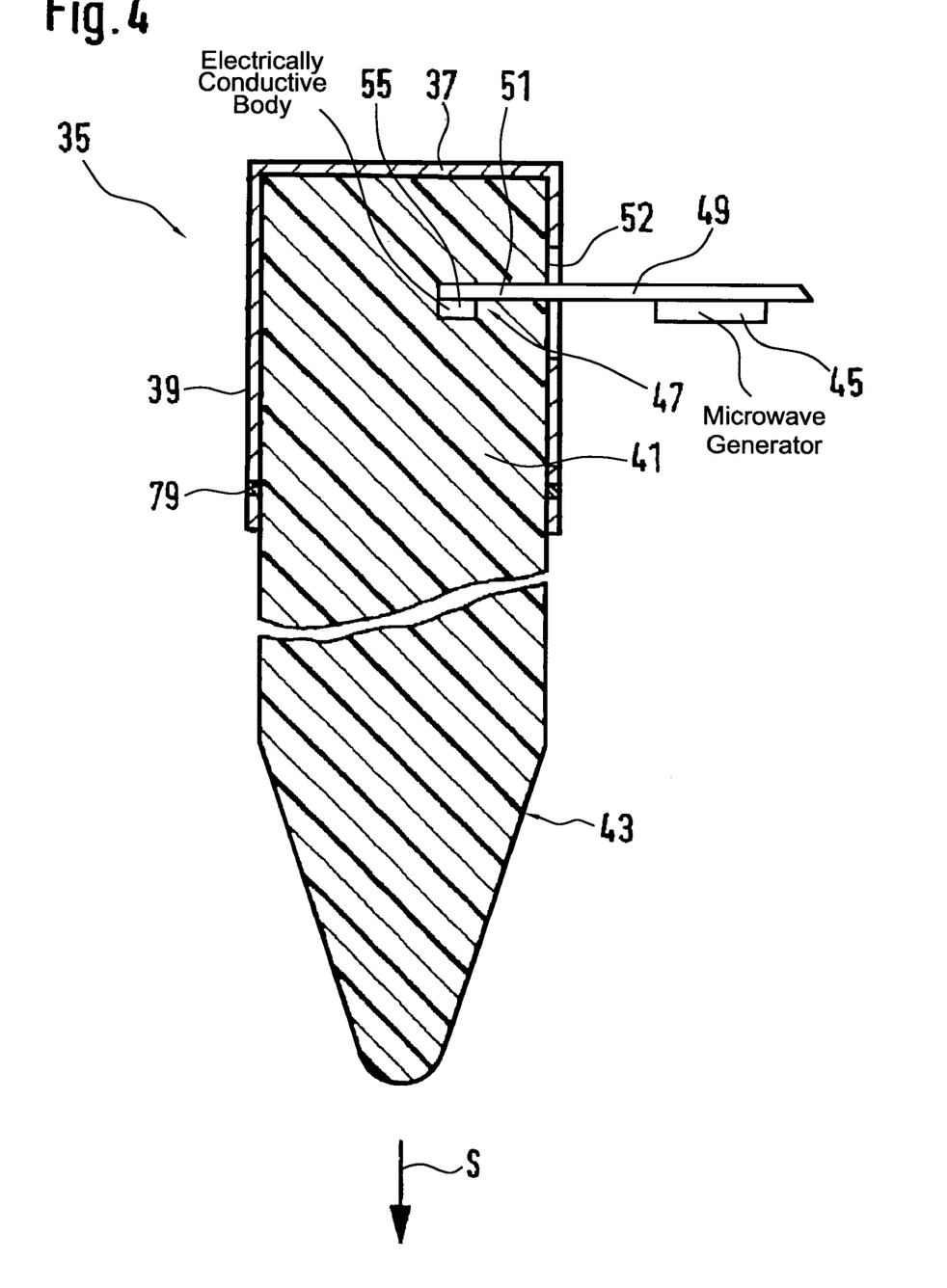
FIG. 4 is a schematic illustration of a level meter of the invention, in which the transmitter or transceiver element has a microstrip line extending perpendicular to the transmission direction.

FIG. 4 shows a schematic illustration of a further exemplary embodiment of a level meter of the invention. It has an antenna 35, in this case a rod antenna, for transmitting or for transmitting and receiving microwaves. The antenna 35 includes a cylindrical waveguide 39, which is short-circuited on one end by means of a back wall 37 and in which there is an insert 41 of a dielectric, such as polytetrafluoroethylene (PTFE). A dielectric rod 43, which diameter decreases on the end in the transmission direction, is formed onto the insert 41, pointing in the transmission direction represented by an arrow S. Once again, the level meter can in principle also be used without the insert 41, if the measurement environment allows this.

A microwave generator 45 for generating microwaves is disposed directly on the antenna 35. The microwave generator 45 is constructed with planar circuitry and is connected directly to a transmitter or transceiver element 47 that points into the antenna 35. According to the invention, the transmitter or transceiver element 47 is an extension of the connection between the microwave generator 45 and the transmitter or transceiver element 47.

The level meter has a printed circuit board 49, on which the microwave generator 45 is located. The printed circuit board 49 has a portion 51 that is introduced laterally into the antenna 35 through a recess 52 in the waveguide 39. The portion 51 is parallel to and spaced apart from the back wall 37, and on the portion 51 the transmitter or transceiver element 47 is disposed on the portion 51 pointing into the antenna 35.

In the exemplary embodiment shown in FIG. 4, at least one microstrip line disposed on the portion 51 serves as the connection and as the transmitter or transceiver element 47. A microwave-projecting surface of the microstrip line, in the exemplary embodiment shown, points in the transmission direction. Other orientations of the projecting surface, for instance in the direction of the back wall 37, are in principle also possible.

The microwave generator 45 is connected directly, and in particular without the interposition of a lead line that would have to be connected to its two ends, to the microstrip line and thus to the transmitter or transceiver element 47 formed by the microstrip line.

Figure 5:
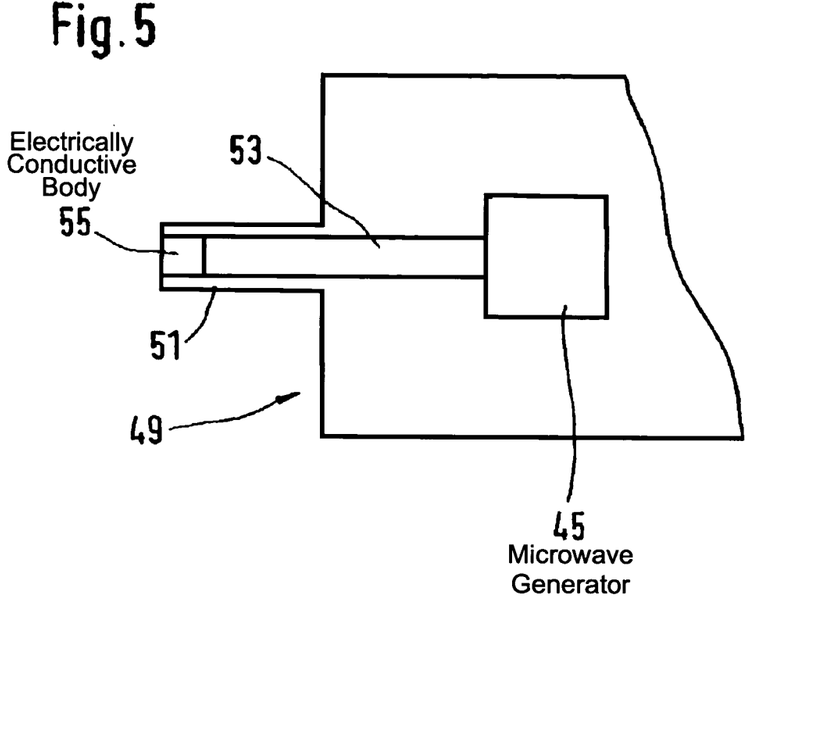
FIG. 5 shows a plan view on a side of the printed circuit board of FIG. 4 pointing in the transmission direction.
Figure 6:
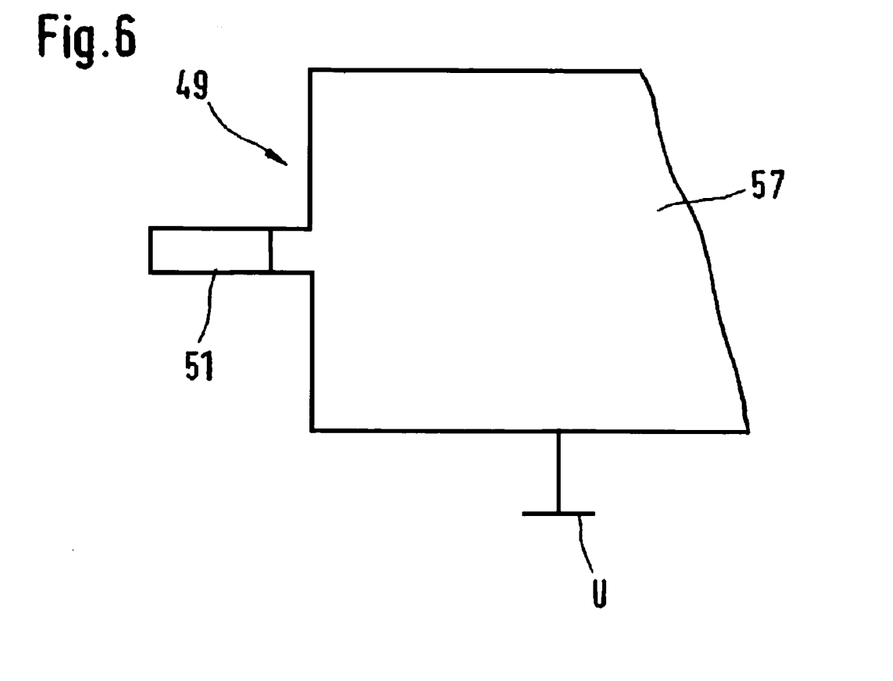
FIG. 6 shows a plan view on a side of the printed circuit board of FIG. 4 pointing away from the transmission direction.

FIG. 5 shows a plan view on a side of the printed circuit board 49 of FIG. 4 pointing in the transmission direction, and FIG. 6 shows a plan view on a side of the printed circuit board 49 of FIG. 4 pointing away from the transmission direction.

As seen from FIGS. 4 and 5, in the exemplary embodiment shown the transmitter or transceiver element 47 includes a microstrip line 53 that is rectilinear. It extends on a face of the portion 53 of the printed circuit board that points in the transmission direction, and it ends in the interior of the waveguide 39.

To improve the transmission properties, an electrically conductive body 55 pointing in the transmission direction is applied to the microstrip line 53 on its end, in the interior of the waveguide 39.

Printed circuit boards with microstrip lines typically have an electrically conductive coating on their surface opposite the surface that has the line structure, and this coating is connected to ground or some other reference potential. As FIG. 6 shows, the printed circuit board 49 likewise has a coating 57, connected to a reference potential U. Simulation calculations and experiments, however, have shown that the transmission power is improved if at least the portion 51 located inside the waveguide 39 is free of coating.

In both exemplary embodiments, the geometry of the transmitter or transceiver elements 25, 47 for level measurement are preferably designed for an excitation of the transversal-electrical 11 mode (TE-11) that is capable of propagation in round waveguides. This mode has a projection characteristic with a pronounced forward lobe and is therefore especially well suited for the directional transmission of microwaves. The dimensions of the waveguide and microstrip lines can then be optimized for a desired frequency by means of simulation calculations. In microwave signals that have a frequency spectrum with a bandwidth, a medium frequency, or a frequency that has a substantial proportion of the microwave power to be transmitted, can be made the basis of the optimization.

However, the invention is limited neither to round waveguides nor to the TE-11 mode, but instead can also be used analogously with other waveguide cross sections, such as rectangular waveguides, and with other propagation modes.

Figure 7:
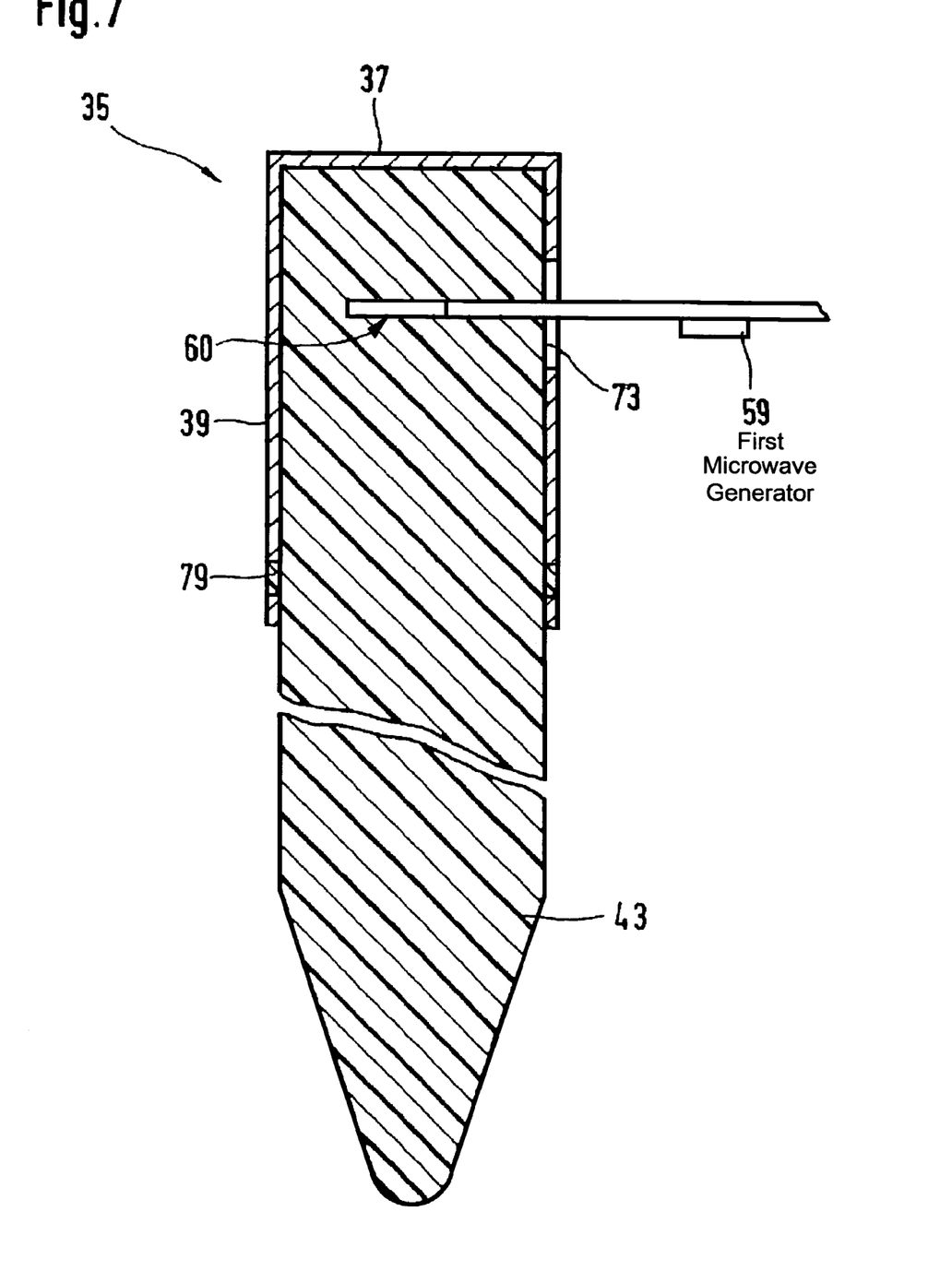
FIG. 7 is a schematic illustration of a level meter of the invention, in which the transmitter or transceiver element has two microstrip lines extending perpendicular to one another and perpendicular to the transmission direction.
Figure 8:
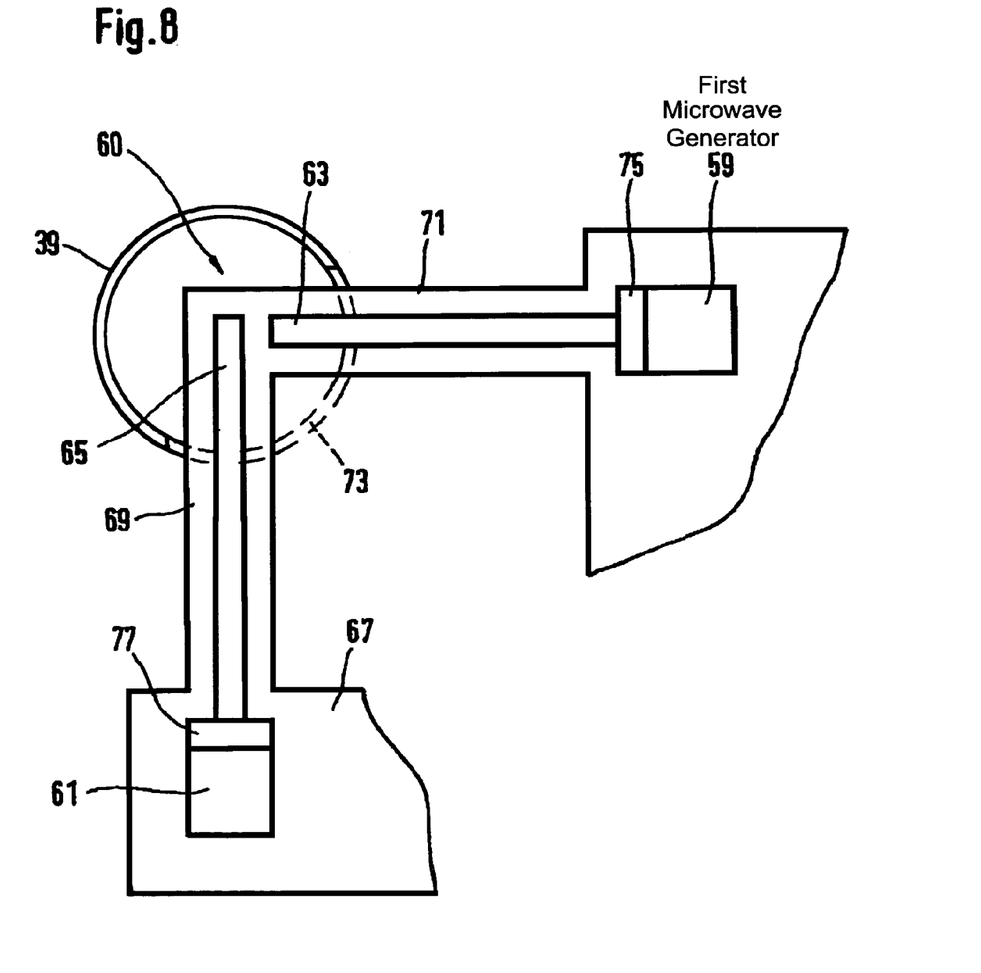
FIG. 8 shows a plan view on a side of the printed circuit board of FIG. 7 pointing in the transmission direction.

FIG. 7 is a schematic illustration of a further exemplary embodiment of a level meter of the invention. It has an antenna 35 for transmitting, or transmitting and receiving, microwaves that corresponds to the exemplary embodiment shown in FIG. 4. It will therefore not be described in detail below. A first microwave generator 59 and a second microwave generator 61, shown in FIG. 8, are disposed directly on the antenna 35.

A transmitter or transceiver element 60 is provided that points into the antenna 35. Here, two microstrip lines 63, 65 serve as the transmitter or transceiver element 60. The microstrip line 63 is connected directly to the microwave generator 59 by means of a connection, and the microstrip line 65 is connected directly to the microwave generator 61 by means of a connection. In both cases, the connection is a continuation of the microstrip lines 63, 65. Thus the transmitter or transceiver element 60 is an extension of the connection to the respective microwave generators 59, 61.

The level meter has a printed circuit board 67, on which the microwave generators 59, 61 are located. The printed circuit board 6 has two rectangular portions 69, 71, pointing into the antenna 35, which border one another at right angles in the interior of the antenna 35. The two portions 69, 71 of the printed circuit board 67 are introduced laterally through an opening 73, spaced apart from the back wall 37, into the waveguide 39. For the sake of better comprehension, a cross-sectional plane of the waveguide 39 in which the printed circuit board 67 is located is shown in FIG. 8. In the exemplary embodiment shown, a round waveguide is provided. Other waveguide cross sections, such as rectangular waveguides, are equally usable. The transmitter or transceiver element 60 is disposed on the portions 69, 71 of the printed circuit board 67.

The two microstrip lines 63, 65 are rectilinear and extend perpendicular to one another on faces, pointing in the transmission direction, of the portions 69, 71 of the printed circuit board 67. They end in the interior of the waveguide 39.

Still other electronic circuit elements, not shown in FIG. 8, that are suitable for picking up, converting and processing microwave signals, such as filters, directional couplers, mixers, and the like, can be disposed on the printed circuit board 67. These components can likewise be made using planar circuitry. If the antenna 35 is used for both transmission and reception, then a directional coupler should for instance be provided, by way of which microwaves from the microwave generators 59, 61 reach the transmitter or transceiver element 60, and microwaves received by the transmitter or transceiver element 60 reach a unit that further processes the echo signals.

A transmitter or transceiver element 60 shown in FIGS. 7 and 8 can for instance be used to transmit, or to transmit and receive, linearly polarized microwaves. Then microwaves generated by the microwave generators 59, 61 are each carried through a polarization filter 75, 77, which can also be made by planar circuitry, at the output of which linearly polarized microwaves are available whose polarization direction extends parallel to the longitudinal axis of the respective microstrip line 63, 65. Because the two microstrip lines 63, 65 are disposed perpendicular to one another, the microwaves transmitted by the microstrip line 63 have a polarization that is rotated 90° compared to the polarization of the microwaves transmitted by the microstrip line 65.

Because of the polarizations rotated 90° from one another, the microwaves transmitted by the microstrip lines 63 and 65 and reflected from a surface of a product can be received and evaluated, cleanly separated from one another. Filtering out microwaves with a previously transmitted polarization direction offers the advantage that interfering and/or scattered reflections, which typically have a polarization direction other than the polarization direction transmitted, can be eliminated. Using two polarization directions at right angles to one another offers increased measurement certainty, since two independent measurement signals can be obtained and evaluated. For instance, a reliable measurement can be accomplished even if one of the polarization directions extends parallel to a strut, or other microwave-reflecting element, such as an agitator mechanism, that extends diagonally through the container.

Figure 9:
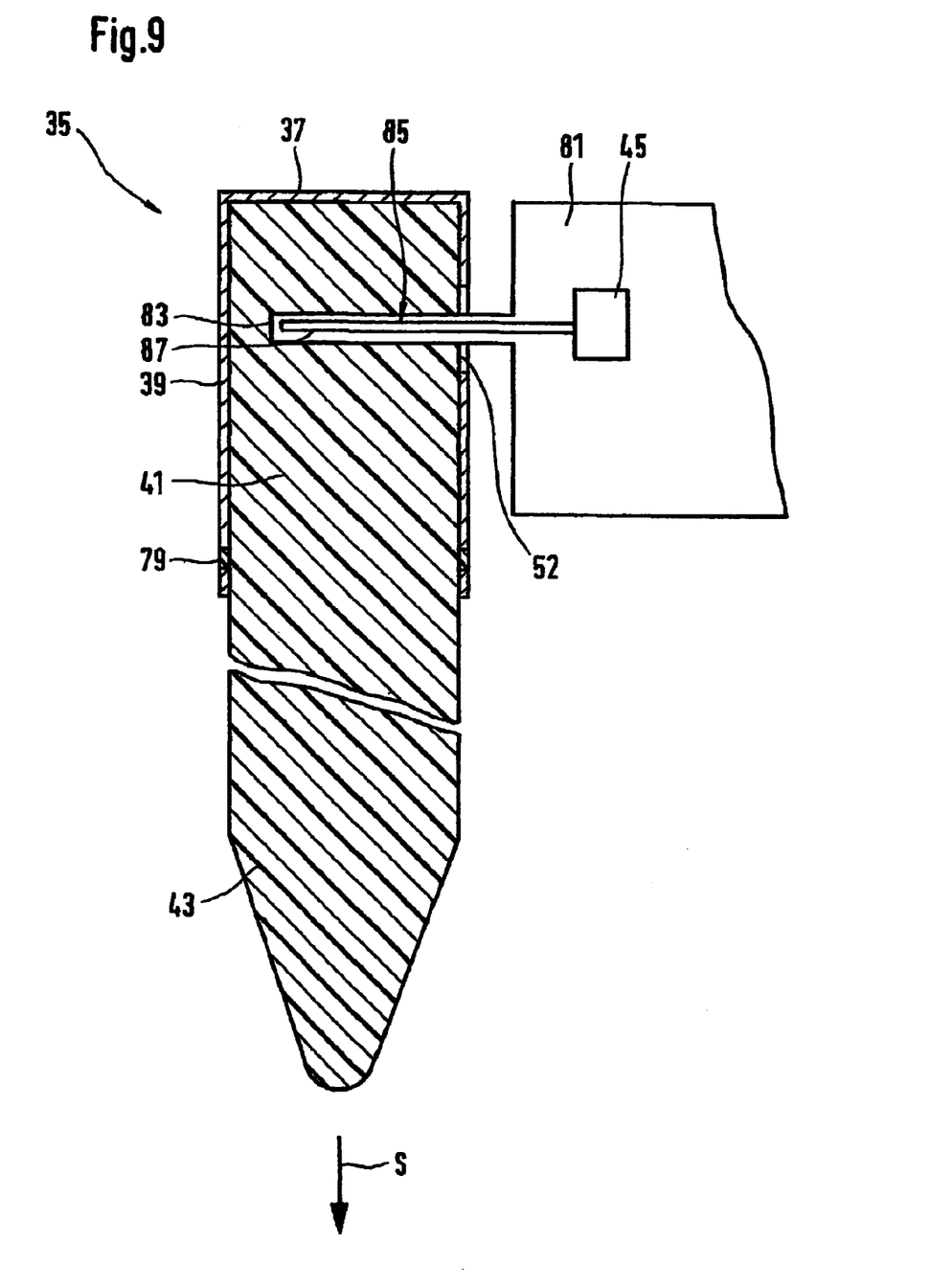
FIG. 9 shows a schematic illustration of a level meter of the invention, in which the transmitter or transceiver element has a microstrip line, extending perpendicular to the transmission direction, whose surface is oriented perpendicular to the transmission direction.

FIG. 9 schematically shows a further exemplary embodiment of a level meter of the invention. It is essentially equivalent to the exemplary embodiment shown in FIG. 4. Only the differences will therefore be described in detail below.

The level meter has a printed circuit board 81, on which the microwave generator 45 is located. The printed circuit board 81 has a portion 83 which is introduced laterally into the antenna 35 through a recess 523 in the waveguide 39. The portion 83 extends perpendicular to the transmission direction S and ends in the interior of the waveguide 39. It is disposed perpendicular to the back wall 37 and spaced apart from it, and a transmitter or transceiver element 85 is disposed on the portion 83 pointing into the antenna 35.

In the exemplary embodiment shown in FIG. 9, at least one microstrip line 87 disposed on the portion 83 acts as the transmitter or transceiver element 85. A microwave-projecting surface of the microstrip line 87 points perpendicular to the transmission direction. The microwave generator 45 is connected directly, in particular without the interposition of a lead line that would have to be connected to its two ends, to the microstrip line and thus to the transmitter or transceiver element 85 that the microstrip line forms.

In the case where a level meter of the invention is to be used at a measurement site where relatively high temperatures occur, the antenna 15, 35 preferably has a thermal decoupler 75 to protect the microwave generator 23, 45. The thermal decoupler can for instance be a portion of the waveguide 17, 39 in which a ring of a material that is a poor heat conductor is placed. Alternatively, an annular portion of the waveguide 17, 39 may be hollow and evacuated, or the waveguide 17, 39 may comprise two cylinders that are joined to one another only at a few points. Many different kinds of thermal decouplers can be used. Even interruptions in the conductive inner surface of the waveguide 17, 39 are possible, as long as the dimensions of these interruptions are small compared to the wavelength of the microwaves in the waveguide 17, 39.

In the exemplary embodiments shown, the respective printed circuit board 27, 49, 69, 71, 81 is guided into the waveguide 17, 39 of the antenna 15, 35. It is understood that instead of this open construction, a seal may be provided all the way around the printed circuit board 27, 49, 69, 71, 81, including in the region in which the printed circuit board 27, 49, 69, 71, 81 penetrates the wall 16, 52, 73 of the waveguide. For instance, a leadthrough, such as a glass leadthrough or a leadthrough filled with a plastic, such as polytetrafluoroethylene (PTFE), into the corresponding openings may be provided. Alternatively, the printed circuit boards 27, 49, 69, 71, 81 can each have an interruption in the region of the wall 16, 53, 73, and a conventional, commercially available leadthrough with line ends extended to the outside at the end can be inserted at this point into the waveguide wall 16, 53, 73. In this case, the line ends should be connected directly to the microstrip lines 31, 33, 63, 65, 53, 87.

Figure 10:
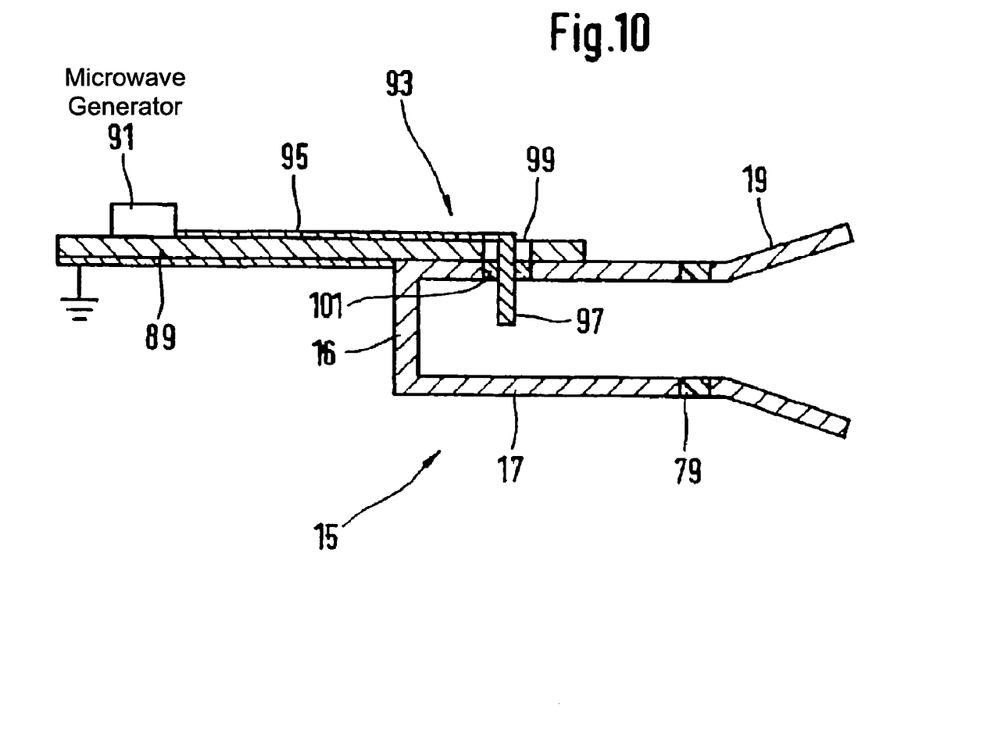
FIG. 10 shows a section through a schematic illustration of a level meter of the invention, in which the transmitter or transceiver element is a metal pin connected to a microstrip line.
Figure 11:
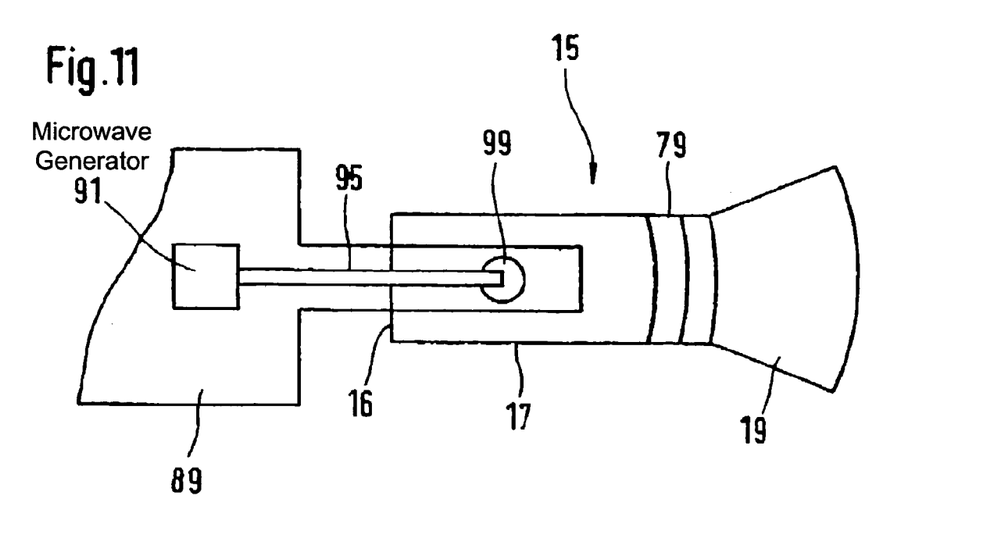
FIG. 11 shows an elevation view of the level meter shown in FIG. 10.

FIG. 10 shows a section through a further exemplary embodiment of a level meter that operates with microwaves. FIG. 11 shows an elevation view of it. The level meter has an antenna 15, which essentially corresponds to the horn antenna shown in FIG. 2. It is used to transmit, or transmit and receive, microwaves and has a cylindrical waveguide 17, short-circuited at the end by a back wall 16, and a funnel-shaped horn 19 adjoining it in the transmission direction. However, the invention is not limited to round waveguides. Other waveguide geometries are equally usable.

A printed circuit board 89 on which a microwave generator 91 is disposed directly on the antenna 15 is mounted on the outside of the waveguide 17. Just as in the exemplary embodiments described above, the microwave generator 91 is for instance a pulse radar device, FMCW device, or continuous oscillation microwave oscillator, in each case constructed on the basis of planar circuitry.

The level meter has a transmitter or transceiver element 93, pointing into the antenna 15 and connected directly to the microwave generator 91 by means of a connection.

In the exemplary embodiment shown in FIGS. 10 and 11, the connection is a microstrip line 95, which extends on the side of the printed circuit board 89 pointing away from the antenna. A metal pin 97 serves as the transmitter or transceiver element 93. The metal pin 97 leads through the printed circuit board 89 and the waveguide 17 and extends into the antenna 15.

The metal pin 97 is mounted on a side of the microstrip line 95 pointing toward the antenna 15. In this region, the printed circuit board 89 has a recess 99, through which the side of the microstrip line 95 toward the antenna is accessible. Below the recess 99, there is an opening in the wall waveguide 17, through the metal pin 97 leads into the antenna 15.

The metal pin 97 is an extension of the microstrip line 95. The transmitter or transceiver element 93 is accordingly an extension of the connection with the microwave generator.

A leadthrough 101 is provided in the opening in the waveguide 17; it fills an annular-cylindrical gap between the metal pin 97 and the waveguide 17. The leadthrough serves as a seal and can for instance also comprise glass or a plastic, such as polytetrafluoroethylene (PTFE).

As in the exemplary embodiments described above, once again a thermal decoupler 79 is provided here.

The invention claimed is:

1. A level meter operating with microwaves, having:
    an antenna for transmitting or for transmitting and receiving microwaves;
    a printed circuit board;
    a microwave generator disposed directly at said antenna and located on a portion of said circuit board;
    a transmitter or transceiver element, pointing into said antenna and connected directly with said microwave generator, wherein:
    said transmitter or transceiver element extends from said microwave generator; and
    one portion of said printed circuit board is pointing into said antenna, on which portion said transmitter or transceiver element is disposed.

2. The level meter operating with microwaves according to claim 1, wherein:
    at least one microstrip line serves as said transmitter or transceiver element.

3. The level meter operating with microwaves according to claim 1, wherein:
    said antenna includes a cylindrical waveguide, short-circuited on one end by means of a back wall, and said portion of said printed circuit board is introduced laterally into said waveguide and is spaced apart from said back wall.

4. The level meter operating with microwaves according to claim 3, wherein:
    said transmitter or transceiver element includes a rectilinear microstrip line, which extends on a face of said portion of said printed circuit board pointing in the transmission direction and ends in the interior of said waveguide.

5. The level meter operating with microwaves according to claim 4, further having:
    an electrically conductive body, wherein:
    said electrically conductive body points in the transmission direction and is applied to said microstrip line on its end in the interior of said waveguide.

6. The level meter operating with microwaves according to claim 3, wherein:
    said transmitter or transceiver element includes a rectilinear microstrip line, which extends on a face of said portion of said printed circuit board pointing perpendicular to the transmission direction and ends in the interior of said waveguide.

7. The level meter operating with microwaves according to claim 3, wherein:
    said transmitter or transceiver element includes two rectilinear microstrip lines, which extend perpendicular to one another on faces of said printed circuit board that point in the transmission direction, and which end in the interior of said waveguide.

8. The level meter operating with microwaves according to claim 1, wherein:
said antenna has a cylindrical waveguide short-circuited on the end, and a portion of said printed circuit board is extended into said antenna, parallel to a longitudinal axis of said printed circuit board.

9. The level meter operating with microwaves according to claim 8, wherein:
said transmitter or transceiver element includes a first microstrip line, extending on a first surface of said portion of said printed circuit board, and a second microstrip line, extending on a second surface of said portion of said printed circuit board.

10. The level meter operating with microwaves according to claim 9, wherein:
said first and second microstrip lines each have one rectilinear segment, whose first end is connected to said microwave generator and whose second end is adjoined by a curved segment.

11. The level meter operating with microwaves according to claim 1, wherein:
said connection is a microstrip line, and said transmitter or transceiver element is a metal pin, applied to said microstrip line and extending into said antenna.

12. The level meter operating with microwaves according to claim 1, wherein:
said antenna has a thermal decoupler.

* * * * *